Feb. 11, 1964 D. W. FOSS 3,121,205
TUNABLE CAVITY HAVING DEFORMABLE WALL THAT PIVOTS ABOUT
THE EDGE OF A CONSTRAINING MEMBER DURING FLEXURE
Filed May 5, 1960 2 Sheets-Sheet 1

INVENTOR.
DAVID W. FOSS
BY Edgar O. Rost
ATTORNEY

INVENTOR.
DAVID W. FOSS
BY Edgar O. Rost
ATTORNEY

United States Patent Office
3,121,205
Patented Feb. 11, 1964

3,121,205

TUNABLE CAVITY HAVING DEFORMABLE WALL THAT PIVOTS ABOUT THE EDGE OF A CONSTRAINING MEMBER DURING FLEXURE

David W. Foss, Beverly, Mass., assignor, by mesne assignments, to Varian Associates, Palo Alto, Calif., a corporation of California Filed May 5, 1960, Ser. No. 27,097
4 Claims. (Cl. 333—83)

The present invention relates to microwave transmission systems and more particularly to apparatus used in such systems to determine precisely the resonant frequency.

In certain navigation or communication systems employing microwaves, it is essential to proper operation that the frequency propagated in such systems be precisely known and maintained. Since cavity resonators are suited for this purpose, it is necessary that they be tuned to and maintain under varied environmental conditions very precise frequencies. Conventional cavity resonators employ a tuning plunger or capacitive post to determine the resonant frequency, as well as selected metals having desirable thermal expansion characteristics. Inherent problems in the production of cavity resonators such as allowances for mechanical tolerances, concentricity and humidity effects prevent precise setting of frequency during fabrication.

The present invention, therefore, has for its primary object, the provision of an improved and novel tuning structure for a microwave cavity resonator.

The principal feature of the present invention is that after completion of the assembly and pumping operations, the cavity may be easily and accurately tuned to the desired frequency by means of a mechanical structure wholly contained within the overall resonator configuration. The mechanical structure comprises a member of minimal thickness, consistent with material strength considerations, defining one end wall of the resonant cavity. A tuning mechanism provides for the gradual moving of the end wall member to thereby alter the volume of the cavity.

The requirements for extremely skilled technicians to fabricate cavity resonators of the type discussed herein may, therefore, be relaxed with accompanying savings in labor and time. Hence, after the completion of the assembly and pumping operations, the final tuning adjustment is made to the precise frequency required for such devices. This will assure a more accurate and reliable product.

Other features, advantages and objects will be readily appreciated after consideration of a detailed description of a specific embodiment and reference to the accompanying drawings, in which.

Figure 1:
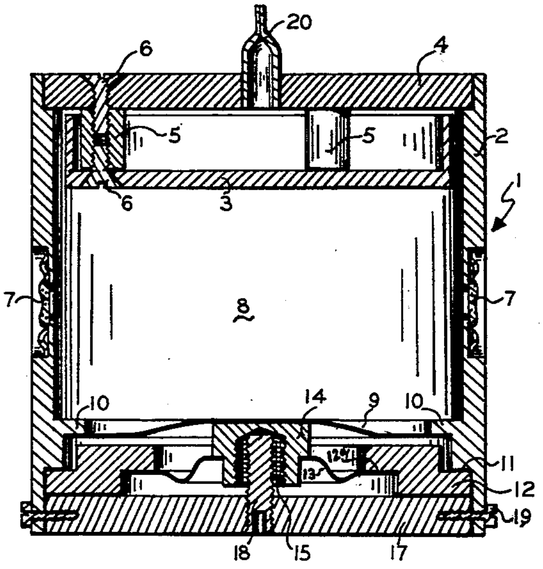
FIG. 1 is a longitudinal cross-sectional view of a portion of the embodiment of the invention.

Referring to the drawings wherein like numerals refer to similar parts, the illustrative cavity resonator is shown generally at 1 in FIG. 1 comprising a hollow conductive body member 2 defining a cylindrical chamber. A temperature compensated tuning plunger 3 is secured to rigid end wall 4 enclosing one end of the body member by means of spacers 5 and oppositely disposed retaining screws 6. The dimensions of each spacer 5 serve to provide, what may be termed the "rough" tuning within the desired frequency band of operation, preferably at the low end of the band. However, the spacers primarily function as a compensating mechanism for any frequency changes due to temperature differences and are preferably fabricated of aluminum or brass. Windows 7 are recessed within the body member 2 and provide means for transmission of electromagnetic energy within the cavity resonator.

A thin flexible metallic plate 9 is loosely positioned at the opposite end of the chamber abutting a ridge 10 provided in the side walls of the chamber. Metallic plate 9 defines with plunger 3 a high Q resonant cavity 8. The metal alloy "Invar" is selected for the plate, as well as body member 2, end wall 4 and plunger 3 because of its extremely low coefficient of expansion. A pre-assembled tuning mechanism is inserted into the body member and may be secured to the side walls as at 11 by conventional hermetic sealing techniques such as brazing or soldering. The tuning mechanism comprises a collar member 12 defining a shoulder **12*a* to support the outer edge of the circular convoluted metallic diaphragm 13 permanently secured thereto as by brazing. A center post 14 extends into a central aperture to the diaphragm 13 and is permanently secured thereto. Axial bore 15 extends a substantial distance within the center post and may be threaded as at 16** for the purpose to be hereinafter described.

Figure 2:
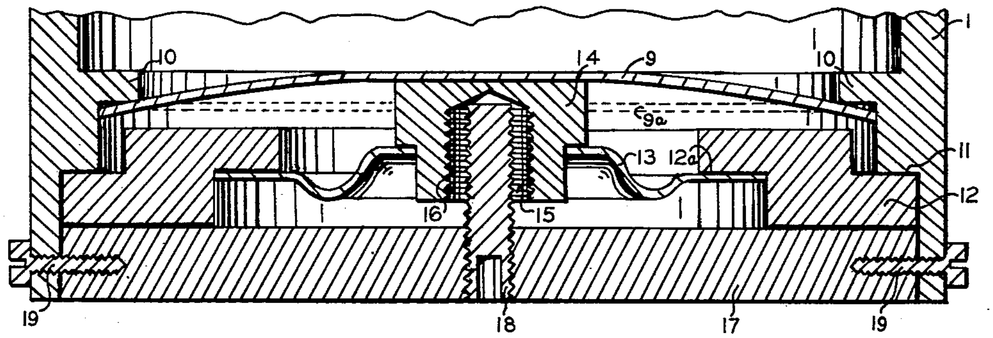
FIG. 2 is an enlarged cross-sectional view of a portion of the embodiment shown in FIG. 1.

Center post 14 contacts the central section of plate 9. Initially the plate is flat as shown in FIG. 2 by dotted lines and indicated by reference numeral **9*a*. Member 17 having a central tapped aperture provides for the insertion of tuning screw 18 with its inner end engaging the bottom of the bore 15. Rotation of screw 18 provides the necessary force to distort the plate 9 to the bowed position shown with the marginal edge of the plate 9 pivoting about the point of contact with the ridge 10 to obtain greater flexure of the plate 9 and thus greater tuning range. Hence, as the cavity dimensions are changed by the inward bowing of the plate, the volume of the cavity 8 varies and tuning to the desired frequency may be realized. Cover member 17 is secured to the body member by means of screws 19. In the event that the plate is bowed too far, cover member 17 may be removed and the tuning post may be moved in the reverse direction by the insertion of a tool in the threaded bore 15**.

Figure 3:
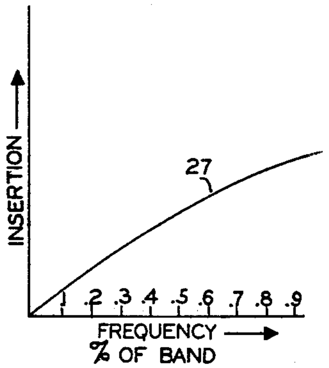
FIGS. 3, 4 are performance curves.
Figure 4:
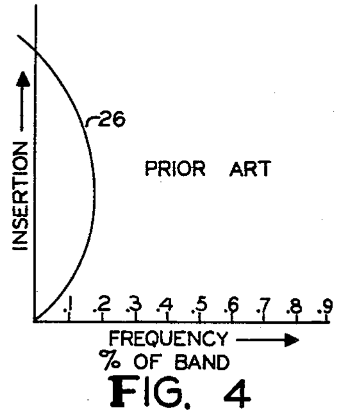

The cavity resonator may be exhausted by conventional pumping techniques and filled with a desirable atmosphere such as dry nitrogen by means of tubulation 20 extending through end wall 4. To describe the operation of the illustrative embodiment the important consideration resides in the selected electromagnetic mode propagated within the high Q cavity resonator. In the $TE_{0,1,n}$ mode the electromagnetic field intensity is at a minimum at the point peripheral contact between the plate 9 and the ridge 10, while the field distribution is at its maximum adjacent to the axis of the cylindrical cavity 8. Prior art tuning structures, notably screws or posts, have not been practical since the overall frequency band capable of being tuned is limited to approximately .1%. The curve 26 in FIG. 4 indicates that as the insertion of the tuning member is increased the frequency is increased until further insertion results only in a decrease of the resonant frequency. The present embodiment of the invention has been evaluated at several frequency bands, including C, S, and X, in the microwave region and has resulted in the curve 27 in FIG. 3 showing a substantially linear response over approximately .9% of the band without mode distortion or loss of Q.

Figure 6:
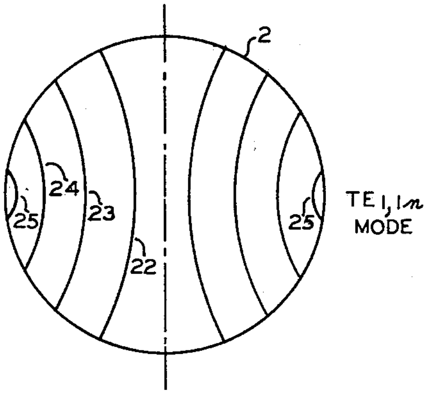
FIG. 6 is a plot diagram of the $TE_{1,1,n}$ mode.
Figure 5:
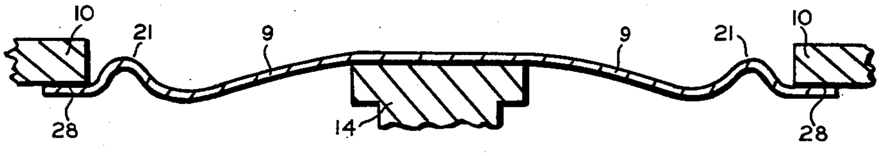
FIG. 5 is a fragmentary view incorporating an alternative embodiment for the cavity end wall member.

While an illustrative embodiment has been shown for use in propagation of the $TE_{0,1,n}$ mode, the modification shown in FIG. 5 will facilitate the use of the tuning mechanism in the $TE_{1,1,n}$ mode. In this mode the configuration of the electric field is shown in FIG. 6 with the lines 22, 23, 24 and 25 indicating the maxima points. It will be noted that a finite current does flow between the cylinder side walls and the end wall in the region indicated by lines 25. As a result, the peripheral edges of the flexible plate 9 must be maintained in good electrical contact with the cavity side walls by means of a brazed or soldered seal 28 to ridge 10. Since the plate will be bowed inwardly at the center while the edges are permanently anchored, convolution 21 is provided to permit the movement at the center without destroying the point of seal. In all other respects, the structure of the resonator incorporating the present invention will be identical to the first embodiment described herein.

There has thus been disclosed a selected embodiment of the invention and it will be evident that many variations and modifications may be practiced within the scope of the invention as defined in the appended claims.

What is claimed is:

1. A microwave cavity resonator including, a rigid hollow metallic body member defining a cylindrical side wall of a chamber therein, said hollow body member having first and second spaced apart rigid end walls closing the ends of said hollow body, a first deformable metallic wall extending transversely within said chamber and defining one end wall of a cylindrical resonant cavity, the outer marginal edges of said deformable wall being physically constrained at said marginal edge in a direction taken axially of said resonant cavity and loosely positioned in a direction taken toward the interior of said resonant cavity whereby said first deformable wall is pivotably supported about the point of constraint at its marginal edge to facilitate flexure of said first deformable wall, adjusting means interconnecting said first deformable wall and said first rigid end closing wall for controlling movement of said deformable wall to distort said deformable wall into an inwardly bowed configuration to alter the frequency at which said cavity is resonant, said adjusting means including a post member operatively interconnecting the central section of said deformable metallic wall and said first rigid end wall, and a second readily deformable wall disposed outwardly of said first deformable wall and interiorly of said first rigid wall for hermetically sealing said adjusting means to said hollow metallic body whereby said first deformable wall is isolated from the ambient atmosphere enveloping said metallic body member to render said cavity resonator nonresponsive to changes in pressure of the ambient atmosphere while permitting adjustment of said first deformable wall.

2. The apparatus according to claim 1 wherein said post member of said adjusting means is formed by a screw axially directed of said cavity resonator, said screw being threaded through a threaded opening in said first rigid wall and bearing at its innermost end upon the back side of said deformable wall for bowing said deformable wall inwardly of said resonator for tuning of said cavity resonator.

3. The apparatus according to claim 1 wherein said cavity is dimensioned to support wave energy in a dominant $TE_{0,1,n}$ mode.

4. The apparatus according to claim 1 including, a ridge formed on the interior wall surface of said hollow body member, and wherein said deformable wall is constrained at its marginal edge by bearing against said ridge.

References Cited in the file of this patent

UNITED STATES PATENTS

| | | |
|---|---|---|
| 2,409,321 | Stephan | Oct. 15, 1946 |
| 2,409,693 | Okress | Oct. 22, 1946 |
| 2,486,129 | De Walt | Oct. 25, 1949 |
| 2,883,630 | Wheeler | Apr. 21, 1959 |
| 2,998,582 | Riblet | Aug. 29, 1961 |